(12) United States Patent
Carkner et al.

(10) Patent No.: US 7,944,662 B2
(45) Date of Patent: May 17, 2011

(54) MULTI-BATTERY SYSTEM FOR HIGH VOLTAGE APPLICATIONS WITH PROPORTIONAL POWER SHARING

(76) Inventors: Steve Carkner, Ottawa (CA); Ahmed Abdelsamie, Ottawa (CA)

(*) Notice: Subject to any disclaimer, the term of this patent is extended or adjusted under 35 U.S.C. 154(b) by 111 days.

(21) Appl. No.: 12/259,781

(22) Filed: Oct. 28, 2008

(65) Prior Publication Data

US 2010/0103579 A1   Apr. 29, 2010

(51) Int. Cl.
*H02H 3/20* (2006.01)
*H02H 3/24* (2006.01)
*H02J 7/00* (2006.01)

(52) U.S. Cl. .......... 361/90; 320/117; 320/125; 320/126; 320/127

(58) Field of Classification Search .................. 320/117, 320/124, 125–127; 361/90
See application file for complete search history.

(56) References Cited

U.S. PATENT DOCUMENTS

| | | | |
|---|---|---|---|
| 7,508,171 B2* | 3/2009 | Carrier et al. | 320/138 |
| 7,589,498 B2* | 9/2009 | Choy | 320/119 |
| 2008/0157717 A1* | 7/2008 | Weston et al. | 320/126 |

* cited by examiner

*Primary Examiner* — Dharti H. Patel
(74) *Attorney, Agent, or Firm* — Gordon Thomson (57) ABSTRACT

A multi-battery system comprises a circuit having a circuit positive terminal and a circuit negative terminal. At least two batteries are provided to combine to deliver required system power. The batteries are connected to a protection circuit, an energy storage device, a system output voltage sensor and a logic gate. The protection circuit generates a protection signal and the voltage sensor generates an enabling signal that are fed into the logic gate as true signals to generate a true control signal. The true control signal causes the energy storage device to discharge. The digital enabling signal for each of the circuits is time-shifted by a time "t" so that at any time one of the circuits is discharging and one of the at least two circuits is charging during said time "t".

17 Claims, 6 Drawing Sheets

PRIOR ART

Figure 3

PRIOR ART

Figure 6

MULTI-BATTERY SYSTEM FOR HIGH VOLTAGE APPLICATIONS WITH PROPORTIONAL POWER SHARING

CROSS-REFERENCE TO RELATED APPLICATIONS

None.

BACKGROUND

1. Field of the Invention

This invention relates to a method or apparatus for controlled or regulated charging, discharging, or combined charging and discharging of one or more voltaic cells, batteries, or capacitors. Specifically, this invention relates to a multi-battery system for high-voltage applications with proportional power sharing.

2. Description of the Prior Art

A number of operationally critical applications have power requirements that require high voltages and currents and require a high degree of availability and reliability. One way of ensuring high reliability is to have a high degree of redundancy in as many components of the system as possible. In battery operated systems the most critical component is often the batteries and in high voltage applications a large number of batteries may be required to produce the necessary power output. For example, in an uninterruptible power supply (UPS) the system relies on multiple batteries feeding a voltage converter system that increases the system voltage. The UPS relies upon switched mode power supplies formed from inductors, capacitors and other elements in order to convert an incoming DC voltage to an output DC or AC voltage. In cases where redundancy is required, multiple batteries and multiple voltage converters are used to provide power in the event that a single system element fails. The requirement for redundancy can result in very large and unwieldy systems due to the duplication and even triplication of system components. Where multiple battery banks are relied upon to supply an input voltage the system may not share the charge equally between battery banks. This results in one battery bank or one voltage converter supplying the majority of the standby power. Ideally, the system should be able to determine which battery bank has the highest state of charge in order to supply the most reliable input voltage. The inability to do so may result in the UPS continually relying upon a depleted battery bank for input voltage. Overtime, the depleted batteries will fail to charge and the UPS becomes less reliable.

To partially overcome this design deficiency power systems relying upon multiple batteries power share between them. This results in equal power consumption from each battery. However such systems can still fail to take into account the state of charge of the batteries. This will result in a depleted battery continually being called upon to share a load it is not capable of producing. In the end, the battery will fail and the system reliability will be compromised.

Another situation can occur in very large power systems where perhaps hundreds of batteries are used. Individual batteries or groups of batteries can be "hot-swapped". This results in the battery bank containing both older and new batteries having a variety of charge states and reliabilities. Overall, system reliability is reduced. In this situation, a system that is able to detect the state of charge of a battery or battery bank and rely upon the most fully charged batteries to supply input voltage would ensure longer battery life and a greater UPS reliability.

Therefore, in light of the deficiencies in UPS systems noted above, there is a need for a multi-battery system that provides redundant input voltage without the expense and bulk of duplicated or triplicate critical components.

SUMMARY

In accordance with the present invention there is provided a multi-battery system for high-voltage applications having a proportional power sharing scheme. In one embodiment of the present invention there is provided at least two batteries coupled to a respective at least two energy storage means. The energy storage means are controlled by a master monitoring circuit connected at the point of load. Each energy storage means may be additionally controlled by a monitoring circuit on its respective battery. The energy storage means will store more power when connected to a battery having a higher output voltage and hence a higher state of charge. A battery with a lower state of charge will experience a more severe voltage drop under heavier loads. This is detected by the monitoring circuit and the system will be manipulated to favor the battery having the highest state of charge. It can be appreciated that the system of the present invention may comprise an infinite number of batteries combined with an infinite number of storage elements. Where the system comprises N batteries and where the total demanded power output of the system is P, then the total power that each energy storage means must carry would be equal to P/N. Each energy storage means may be designed to handle a larger fraction of the total required power. For example, if each energy storage means were designed such that it handled 2P/N, then only half of the energy storage means would need to function in order to supply the full power requirements of the system. In this way system reliability is increased without having to increase component redundancy.

OBJECTS AND ADVANTAGES

Accordingly, besides the objects and advantages of multi-battery system described herein, several objects and advantages of the invention are:
a. There is no need to install expensive redundant systems to create a system that will provide a high degree of reliability in the event of system component failures.
b. The system automatically allows multiple battery systems to share the power load.
c. Higher states of charge batteries carry a higher proportion of the demanded load than lower state of charge batteries.

DESCRIPTION

Known Systems and their Deficiencies

Figure 1:
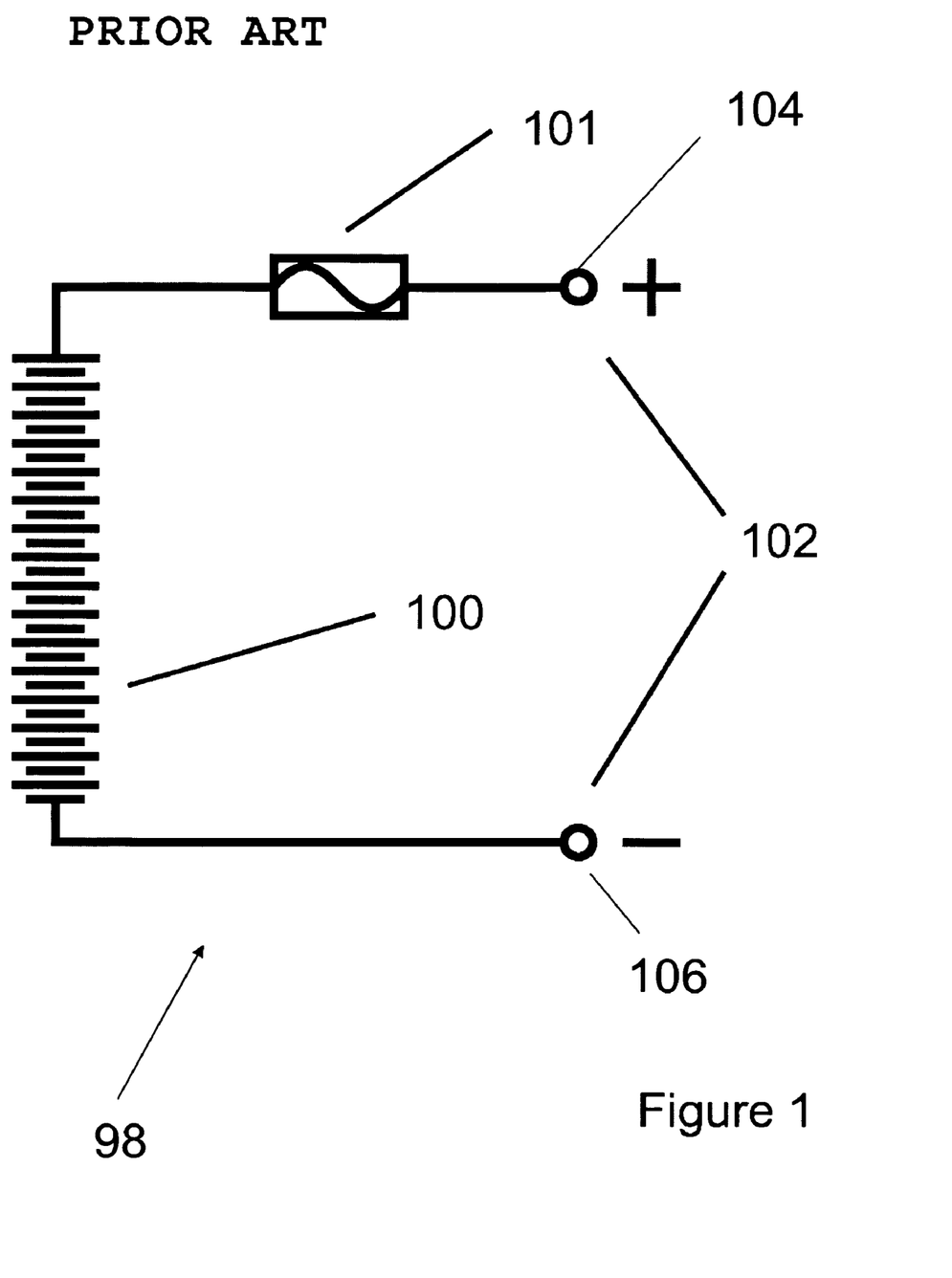
FIG. 1 is a schematic of an example of a known system for generating high voltages from a battery supply.

Referring to FIG. 1, there is shown, as an example, a schematic drawing of a known system 98 for generating high voltages from a battery. The system comprises a battery 100 comprising a plurality of battery cells. The voltage generated by the battery will pass through protection means 101 and be applied to the load 102 across the terminals 104 and 106. If the load requires a voltage of Y volts and each battery cell has a typical voltage of X volts then the total number of cells required in this system can be calculated by X/Y. Since the cells are series connected, the failure of any one cell will result in failure of the battery. As well, the failure of the protection means will also fail the system. Hence, this system is very unreliable.

As the battery 100 discharges the output voltage will vary over time and this will be detrimental to the load 102. Reliability of the system can be improved by regularly changing the used battery 100 with a fresh battery. Alternatively a second battery can be added to the system to increase redundancy. However, both alternatives are not cost or labor efficient. In another embodiment of this known system 98, a circuit could be added to each cell of the battery to detect cell failure and subsequently isolate the cell from the battery. However, the addition of circuitry to each cell of a large battery would result in a costly system and high resistance loads on the battery from the circuitry itself.

Figure 2:
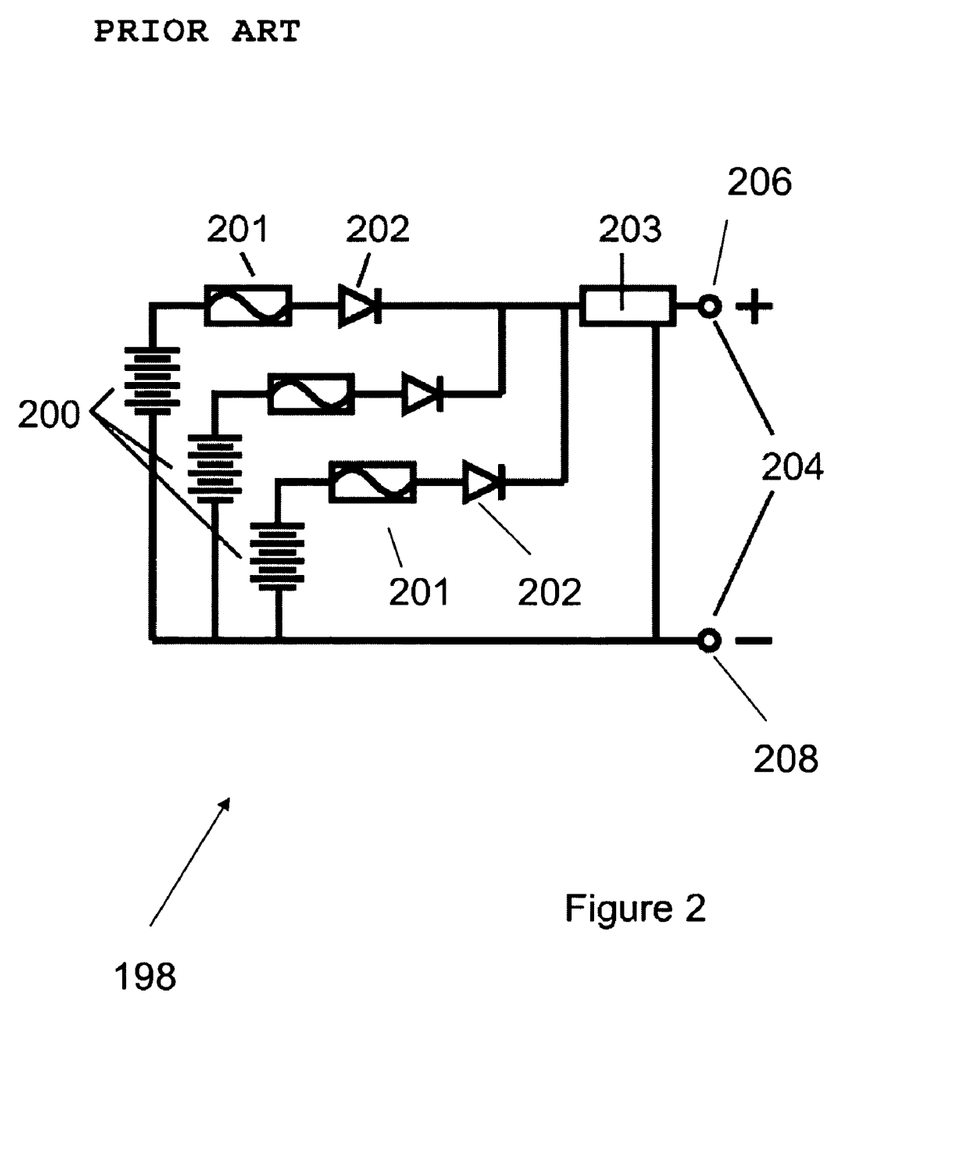
FIG. 2 is a schematic of one known method to increase system reliability.

Referring to FIG. 2, there is shown another example of a battery system 198 for generating high voltages having greater reliability than the system of FIG. 1. In this system there are multiple smaller battery packs 200 to supply the load. This triple redundancy increases the reliability of the voltage source. The each battery circuit comprises a battery pack 200 in series with protection means 201 and voltage blocking element 202. In the event that a battery pack fails, the blocking element will isolate the failed battery circuit from the other two surviving circuits. The current from each battery circuit is then combined before entering a voltage converter 203 which takes the low voltage of the battery packs and increases it to the required system output voltage 204 required by the load across the terminals 206 and 208. The advantage of this system is in the redundancy of the battery circuits. Any one battery circuit (or two circuits) can fail and the system continues to function on the surviving circuit(s). A further advantage of this system is the ability to regulate the voltage output 204 regardless of the state of charge of individual batteries. A disadvantage of this system is the requirement for all of the system power to pass through a non-redundant voltage converter 203. Failure of the voltage converter would fail the system. As well, the system will require heavy cable connections between the voltage converter and the batteries to carry the current demanded by the load. Another major disadvantage of this system is its inability to select the battery circuits having the greatest state of charge. One battery circuit may end up supplying more of the load than the other two circuits depending on the health of the battery cells, cell voltage, cell impedance and impedance of the series components such as protection means 201 and blocking element 202. Another disadvantage of this system is the threshold of the blocking element 202 which may be only a fraction of a volt. In that case, a battery that has a terminal voltage that fraction of a volt higher than all other batteries in the system will end up providing all of the power. The blocking elements will block current from the two lower voltage circuits. This situation is especially dangerous in systems where a freshly charged battery may be hot-swapped into an active system.

Figure 3:
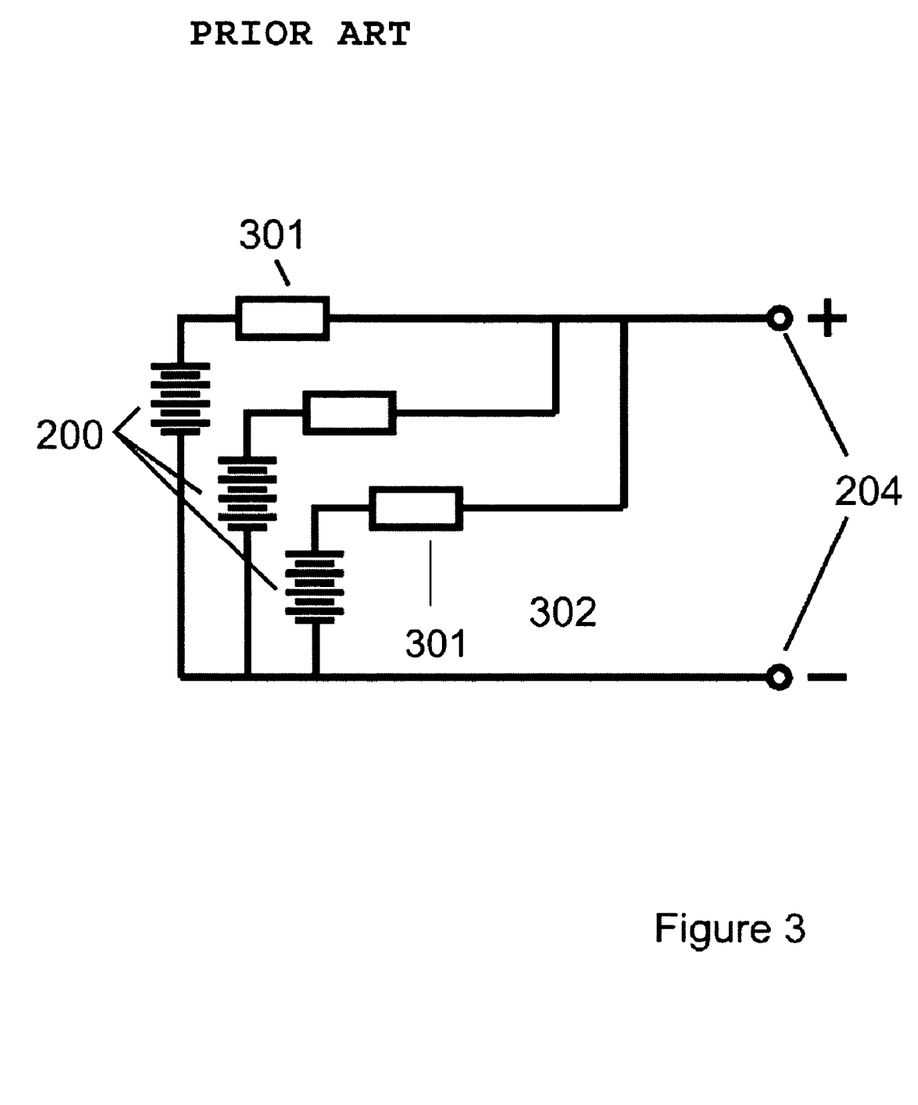
FIG. 3 is a schematic of another known method for increasing system reliability.

Referring to FIG. 3, there is illustrated a schematic of another known method to increase reliability of UPS systems. In the system illustrated 302, each battery 200 in the multiple battery system is serially connected to an independent voltage converter 301. The advantage of this system is that the failure of any battery or any voltage converter will not render the system inoperable. The disadvantage of this system lies in the tendency for the voltage converters 301 to fail to share the system load. If one voltage converter senses the output 204 as being out of tolerance, it may attempt to supply all the power required to bring the output back into regulation. This problem is exacerbated at high loads as the distance from each battery to the load will result in larger measurement errors and therefore the batteries closest to the load are more likely to supply more of the power to the load. This makes it very difficult to balance power distribution across the batteries 200. This problem gets progressively more difficult as more batteries are added to the system. The state of charge of the individual batteries is also ignored in this setup. The amount of power delivered by any individual battery is based solely on the accuracy of the control circuitry involved in response to the load.

Figure 4:
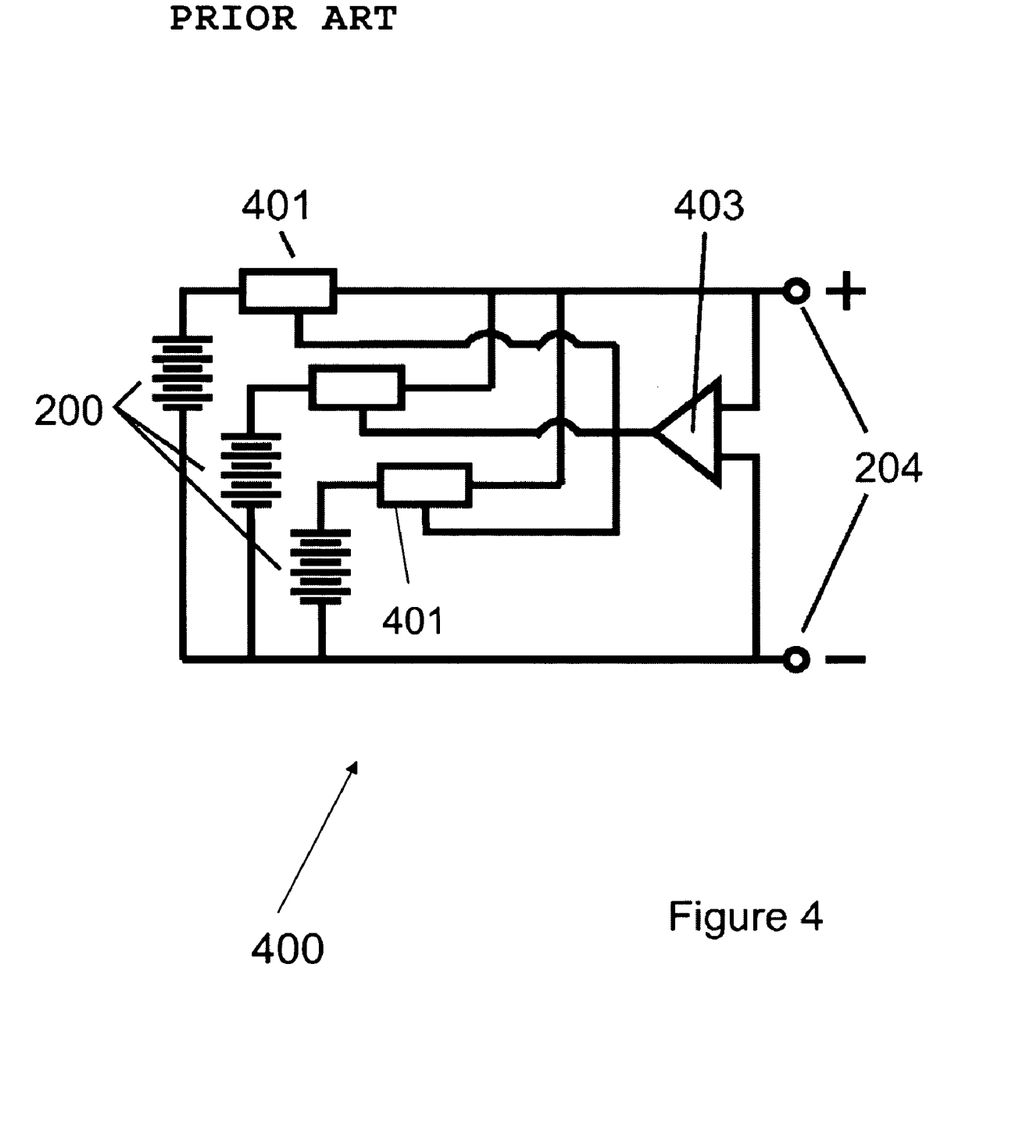
FIG. 4 is a schematic of yet another known method for increasing system reliability.

Referring now to FIG. 4 there is illustrated a circuit 400 that shows an example of a slightly improved approach to improving reliability of multi-battery systems. In this system there are multiple batteries 200 and multiple voltage converters 401 serially connected to each of the batteries. This circuit includes an analog feedback system 403 that permits each of the voltage converters to sense the overall output voltage 204. The analogue feedback system ensures that each of the independent voltage converters 401 will sense the identical output voltage 204. This improves accuracy of voltage regulation but using an analogue signal will have inherent inaccuracies due to how the converters interpret the signal. This may result in a single voltage battery circuit delivering more or less power to the load than the other two battery circuits. This circuit also suffers from inaccuracy because when many batteries are used in a single system the probability of error increases and the distribution of an accurate and noise-free analog signal becomes a challenge. This circuit also ignores the state of charge of the batteries and instead seeks only to balance the amount of power equally among all batteries.

DESCRIPTION OF ONE EMBODIMENT OF THE PRESENT INVENTION

Figure 5:
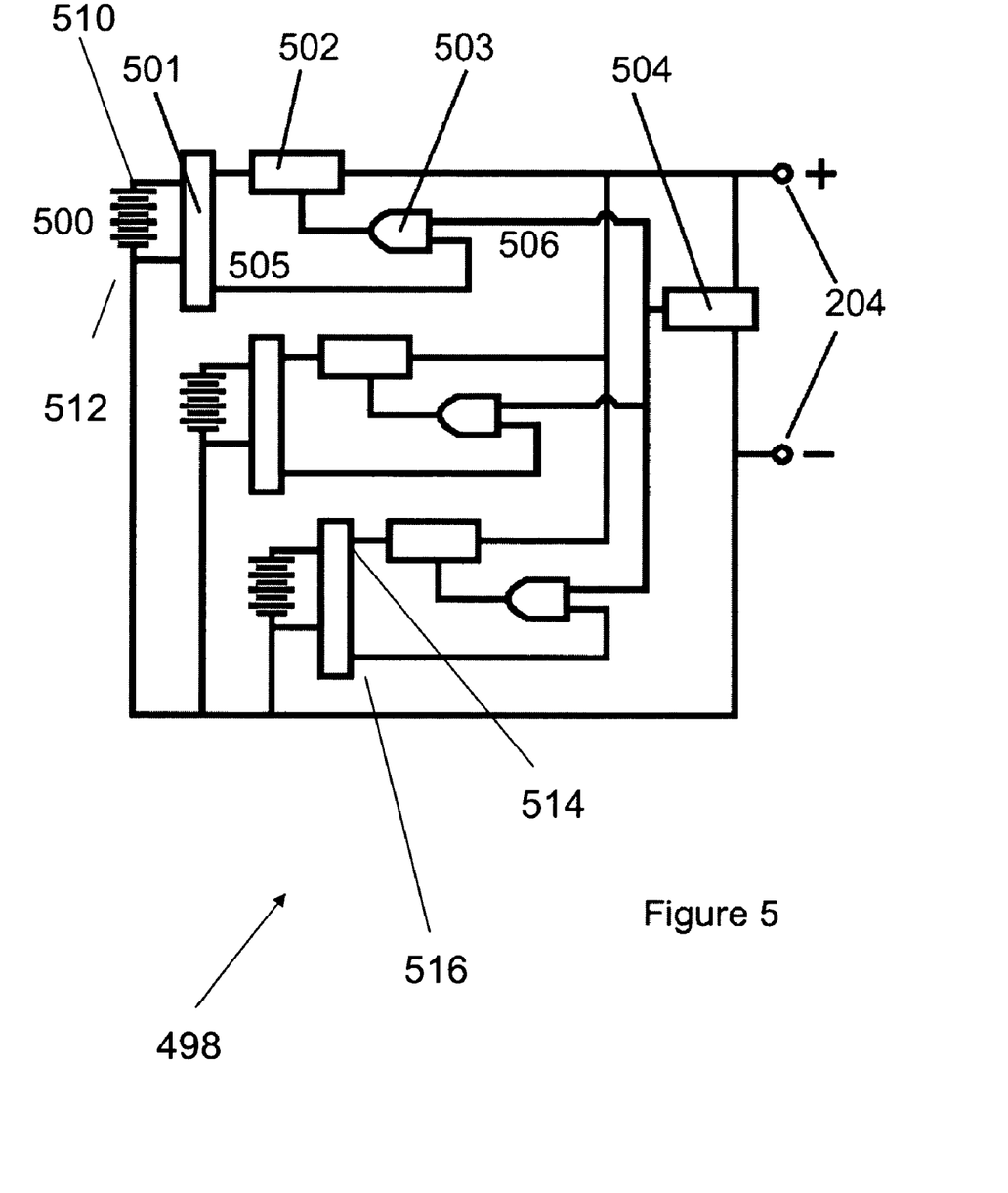
FIG. 5 is a schematic of one embodiment of the invention.

Referring now to FIG. 5, there is shown one embodiment of the present invention that overcomes the deficiencies discussed above. The invention comprise a circuit 498 that comprises a plurality of battery circuits each comprising a battery 500 that is connected to and monitored by protection means 501. Generally the circuit will have at least two batteries and each battery will have a battery positive 510 and a battery negative 512 terminal. This combination of batteries will provide the system with the desired level of voltage output and reliability. Protection means 501 is connected across the battery positive and negative terminals. The output of the protection means is through protection means positive 514 and negative 516 terminals. The protection means output is feed into energy storage means 502 connected to the positive terminal of protection means. The energy storage means stores energy when it receives a true digital control signal from a logic circuit means 503. The logic circuit means is a gate that outputs a true digital control signal when the protection signal 505 from protection means 501 and the digital enabling signal 506 from voltage sensing element 504 are both true. The enabling signal is generated by a voltage sensing element 504 connected across the circuit positive and negative terminals. The voltage sensing element outputs a pulse-width modulated or frequency modulated digital enabling signal that varies with the output 204. If the output is too low, the enabling signal will be true for a larger proportion of time which will cause more energy to be stored in the energy storage means 502. The energy storage means 502 will discharge its stored energy when the digital input to it is false. The energy storage means will typically be composed of an inductor and at least one transistor.

Other elements can be added. In another embodiment of the invention the energy can be stored in capacitors. Energy storage tends to be proportional with voltage. In the case of an inductor when a battery is connected to an inductor, current will ramp up through the inductor at a rate that is proportional to the inductance and the circuit resistance. The current is therefore essentially independent of voltage. The actual power being stored is therefore proportional to the voltage of the battery since power is equal to voltage multiplied by current. Similarly, if the energy storage means is a capacitor, the energy stored is equal to one-half capacitance multiplied by the square of the terminal voltage. Therefore, in the case of a capacitor storage element, a battery with a higher voltage will deliver considerably more power to the load due to the squared dependence on voltage. In this way, the battery 500 with the highest potential, which generally relates to state of charge, will also deliver the most energy to the load 204. This system therefore automatically, and without any specific analog or digital control, has a tendency to cause the battery with the highest capacity to also supply the most power to the load.

Figure 6:
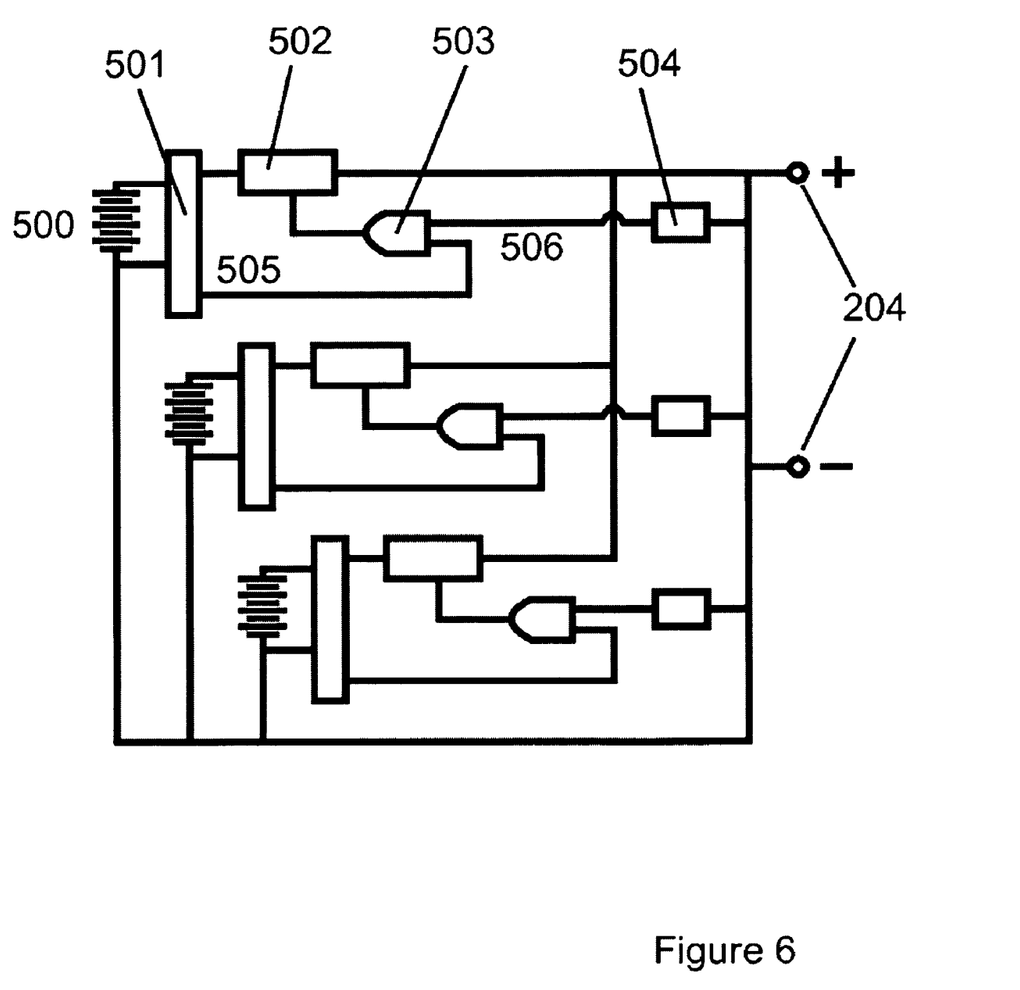
FIG. 6 is a schematic of another embodiment of the invention.

Referring to FIG. 6, power delivery to the output 204 can achieve lower noise by implementing separate controls to each battery 500 or by grouping the controls such that one energy storage means 502 would be discharging into the load while another energy storage means on another battery is charging. If the operating frequency of the enabling signal from the voltage sensing element 504 is F, then a system with two separate control groups would have an output noise frequency of 2 F. Higher output frequencies result in lower total noise as filtering elements become more efficient at eliminating noise as frequency increases. It is possible to have as many control signals as there are batteries.

The system would time shift each control signal the same amount. For example, if there were two enabling signals 506 from two voltage sensors 504 and the system was operating at an update frequency of 1 kHz in a pulse width modulating mode, then the period of the signal is 1/frequency or about 1 milli-second. The two enabling signals would therefore have similar pulse width and identical frequency, but would be time-shifted by 0.5 milli-seconds. If four enabling signals were used, they would ideally be time-shifted by 0.25 milli-seconds. In general, where N enabling signals are used and the expected period of anyone signal is T, then each control signal should be time shifted by approximately T/N.

Protection signals 505 can be generated based on a variety of battery conditions sensed by protection means including, but not limited to, low voltage, high voltage, temperature or high current. The protection signal will allow a given battery to ignore the enable signal 506 that would normally cause power to be taken from the battery. The energy storage means 502 may optionally output a digital disable signal that would cause the charging cycle to terminate prematurely. This signal, which is not shown on FIG. 5, could be generated in the case of excess heat, current, voltage or magnetic flux. Such a signal can also protect the system from a short-circuit on the output 204.

It can also be seen from FIG. 5 and FIG. 6 that any battery or any combination of batteries may be removed from the system at any time. Provided the energy storage means 502 is of sufficient size that the remaining energy storage means can power the system, then the system will continue to function normally.

Although the description above contains much specificity, these should not be construed as limiting the scope of the invention but as merely providing illustrations of some of the presently preferred embodiments of this invention. Any digital gates or signals may be easily redefined such that they perform similar functions as inverse logic or using alternate gates or logic topology. Logic, analog detection and control means may be implemented using integrated circuitry, microprocessor control, software and wireless control.

Thus the scope of the invention should be determined by the appended claims and their legal equivalents rather than by the examples given.

What is claimed is:

1. A multi-battery system for high-voltage applications with proportional power sharing comprising a circuit having a circuit positive terminal and a circuit negative terminal, said circuit comprising:
   a. at least two batteries, wherein each of said at least two batteries has a battery positive terminal and a battery negative terminal, and wherein the at least two batteries combine to provide a desired output voltage and a desired level of redundancy for the circuit;
   b. protection means for said circuit protection, said protection means connected across said battery positive terminal and said battery negative terminal of each of said at least two batteries, wherein the protection means has a protection means positive output terminal and a protection means negative output terminal;
   c. energy storage means connected to said protection means positive output terminal for temporary storage of energy within the circuit;
   d. logic circuit means for generating an output comprising a digital control signal for controlling energy discharge from said energy storage means; and,
   e. a voltage sensing element connected across said circuit positive terminal and said circuit negative terminal for sensing said circuit output voltage and for generating a digital enabling signal for input into said logic circuit means.

2. The system of claim 1 wherein the protection means comprises means to protect circuit against a plurality of battery fault conditions.

3. The system of claim 2 wherein said plurality of fault conditions includes low voltage, high voltage, high current and high temperature.

4. The system of claim 3 wherein the protection means generates a protection signal based on any one of the plurality of fault conditions, and wherein said protection signal is a digital signal for input into said logic circuit means.

5. The system of claim 1 wherein the energy storage means is an inductor combined with at least one transistor.

6. The system of claim 1 wherein the energy storage means is a capacitor.

7. The system of claim 1 wherein the energy storage means stores energy when said digital control signal output from said logic circuit is true.

8. The system of claim 7 wherein the digital control signal is true when the protection signal input is true and said digital enabling signal is true.

9. The system of claim 8 wherein the protection signal is true when the protection means detects said any one of the plurality of battery fault conditions.

10. The system of claim 8 wherein the digital enabling signal is true when output voltage is less than said desired output voltage.

11. The system of claim 1 wherein the energy storage means discharges energy when the digital control signal output from the logic circuit is false.

12. The system of claim 11 wherein the digital control signal is false when the protection signal is false and the enabling signal is false.

13. The system of claim 1 wherein the digital enabling signal is a pulse-width modulated signal.

14. The system of claim 1 wherein the digital enabling signal is a frequency modulated signal.

15. A multi-battery system for high-voltage applications with proportional power sharing comprising at least two circuits combined to produce a desired system voltage and a desired level of system reliability, wherein each of said at least two circuits comprises:
   a. at least one battery, wherein each of said at least one battery has a battery positive terminal and a battery negative terminal, and wherein the at least one battery provides a desired system output voltage;
   b. protection means for protecting each of said at least two circuits, said protection means connected across said positive and said negative battery terminals of each of said at least one battery, wherein the protection means has a protection means positive output terminal and a protection means negative output terminal;
   c. energy storage means connected to said protection means positive output terminal for temporary storage of energy within the circuit;
   d. logic circuit means for generating an output signal comprising a digital control signal for controlling energy discharge from said energy storage means; and,
   e. a voltage sensing element for sensing said circuit output voltage and for generating a digital enabling signal for input into said logic circuit means.

16. The system of claim 15 wherein said digital enabling signal for each of said at least two circuits is time-shifted by a time "t" so that at any time one of the at least two circuits is discharging and one of the at least two circuits is charging during said time "t".

17. The system of claim 16 wherein the enabling signal for each of the at least two circuits is pulse-width modulated having an output frequency F and a period $T=1/F$ so that in a system having N circuits, time "t" is equal to $T/N$.

* * * * *